UNITED STATES PATENT OFFICE 2,382,874

MODIFIED ACETALS

William Franklin Gresham, Wilmington, Del., assignor to E. I. du Pont de Nemours & Company, Wilmington, Del., a corporation of Delaware No Drawing. Application December 24, 1941, Serial No. 424,292

2 Claims. (Cl. 260—615)

This invention relates to a process for the preparation of organic high molecular weight polymer-like compounds and more particularly to their preparation from 1,3-dioxolane and acetals. It likewise relates to the resulting products.

The present invention provides new reaction products obtainable from the reaction of 1,3-dioxolane with other organic compounds. Another object of the invention is to provide new compositions of matter from 1,3-dioxolane or its substitution products and acetals. Yet another object is to provide a process for the interaction of 1,3-dioxolane and its substitution products with acetals in the presence of an acidic type catalyst. Another object is to provide reaction conditions and catalysts for such reactions, whereby valuable products are obtainable. Other objects and advantages of the invention will hereinafter appear.

Valuable products are obtained in accord with the invention by reacting 1,3-dioxolane, substituted 1,3-dioxolane, or reactants which form these compounds with acetals which include, for example, the formals:

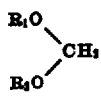

Dimethyl formaldehyde acetal
Diethyl formaldehyde acetal
Methyl ethyl formaldehyde acetal
Dipropyl formaldehyde acetal
Methyl propyl formaldehyde acetal
Ethyl propyl formaldehyde acetal
Dibutyl formaldehyde acetal
Methyl butyl formaldehyde acetal
Ethyl butyl formaldehyde acetal
Propyl butyl formaldehyde acetal
Dibenzyl formaldehyde acetal
Dinaphthyl formaldehyde acetal and the higher formals in which $R_1$ and $R_2$ are similar or dissimilar alkyl, aryl, aralkyl, cyclic or alicyclic groups and especially hydroxy alkyl substitutions such as: compounds having the structural formula $RCH(O(CH_2)_nOH)_2$, in which $n$ is a positive integer greater than 1, examples of which include:

(Methoxymethoxy) ethanol
$CH_3OCH_2O(CH_2)_2OH$ (Ethoxymethoxy) ethanol
$C_2H_5OCH_2O(CH_2)_2OH$ (Propoxymethoxy) ethanol
$C_3H_7OCH_2O(CH_2)_2OH$ (Butoxymethoxy) ethanol
$C_4H_9OCH_2O(CH_2)_2OH$ (Methoxyisopropoxy) ethanol
$CH_3OC(CH_3)_2O(CH_2)_2OH$ (Methoxyethoxymethoxy) ethanol
$CH_3O(CH_2)_2OCH_2O(CH_2)_2OH$ (Alpha-methoxyethoxy) ethanol
$CH_3OCH(CH_3)O(CH_2)_2OH$ (Methoxymethoxy) propanol
$CH_3OCH_2O(CH_2)_3OH$ Beta-(methoxymethoxy) propanol
$CH_3OCH_2OCH(CH_3)CH_2OH$ (Methoxymethoxy) butanol
$CH_3OCH_2O(CH_2)_4OH$ the higher aldehyde acetals,

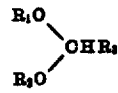

in which $R_1$ and $R_2$ are similar to the above and $R_3$ is a substituted or unsubstituted alkyl group which will give products similar to those described under the formals for acetaldehyde, propanal, butanal, and higher symmetrical and unsymmetrical aldehyde acetals. Substituted acetals may be used in lieu of or in conjunction with the acetals, such as:

2,2-dimethoxypropane
$(CH_3)_2C(OCH_3)_2$ 2,2-diethoxypropane
$(CH_3)_2C(OC_2H_5)_2$ 2-methoxy-2-ethoxypropane
$(CH_3)_2C(OCH_3)OC_2H_5$ Cyclohexanone ketals.

The products of the invention are of relatively high molecular weight, and have at least one 1,3-dioxolane (or substituted 1,3-dioxolane) residue and at least one residue of the acetal with a minimum of at least three residues, for example, the products resulting from the reaction of 1,3-dioxolane with methylal will contain at least one 1,3-dioxolane residue as $-CH_2OCH-CH_2O-$ and at least one methylal residue as $-OCH_2O-$, with a minimum of three residues, two of which are similar. The compounds of the invention, many of which are polymeric in nature, are believed to be primarily linear in form, although the cyclic compounds may be present.

The acetals may be reacted in accord with the procedural details more fully particularized hereinafter, with 1,3-dioxolane and its substitution products. 1,3-dioxolane has the chemical formula with numbering as shown:

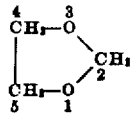

and may be obtained by reacting formaldehyde or a formal with ethylene glycol. Products with substituents in the 2 position can be readily obtained by reaction of ketones or other aldehydes either aliphatic or aromatic with ethylene glycol. Thus, by way of example, many compounds are obtained which may be employed in accord with the invention, such as 2-methyl-1,3-dioxolane,
2-ethyl-1,3-dioxolane,
2,2-dimethyl-1,3-dioxolane,
2,2-diethyl-1,3-dioxolane,
2-phenyl-1,3-dioxolane,
2,2-methylphenyl-1,3-dioxolane, and higher dioxolanes substituted in like manner which may, for example, be obtained from ethylene glycol and acetaldehyde, propanal, acetone, diethyl ketone, benzaldehyde, methyl phenyl ketone, and higher substituted aldehydes respectively. The invention likewise contemplates the use of dioxolanes substituted in the 4 and/or 5 positions. These dioxolanes are obtained by the interaction of substituted 1,2-glycols with aldehydes, for example, 1,2-propylene glycol plus formaldehyde will give 4-methyl-1,3-dioxolane and similarly the following dioxolanes can be readily prepared from formaldehyde and the corresponding glycols:

4-ethyl-1,3-dioxolane,
4-propyl-1,3-dioxolane,
4,5-dimethyl-1,3-dioxolane.

In lieu of 1,3-dioxolane, reactants may be used which form 1,3-dioxolane and in such reactions there would be present the acetal to be reacted together with, for example, formaldehyde and ethylene glycol, or other reactants which will form 1,3-dioxolane.

Valuable compounds are obtainable by the reaction of small amounts of 1,3-dioxolane or its derivatives with large amounts of the acetal, that is, in the order of 1–100 and the reverse is also true. The greater the amount of 1,3-dioxolane present, the greater becomes the viscosity of the compounds until solids are eventually produced, while contrarywise, the greater the ratio of the acetal the less viscous will be the resulting compound. There appears to be no limiting factor restricting the proportion of reactants.

The reaction between the 1,3-dioxolane and the acetal is effected at temperatures ranging between −80 and 300° and preferably between 0 and 150° C. Atmospheric, sub- or super-atmospheric pressures may be used and, if the last, pressure may range between 1 and 1000 atmospheres or higher. Normally excellent results are obtained at or about atmospheric pressure. If desired, the temperature of the reaction, especially when carried out at the boiling point of the reaction mixture, may be controlled by varying the pressure on the boiling reactants.

It has been found advantageous to effect the reaction in the presence of an acidic type catalyst, such, for example, as sulfuric acid, phosphoric acid; the halogen acids, such as hydrochloric acid, hydrofluoric acid (alone or with $BF_3$); boron fluoride (including its complexes with water, acids, esters, alcohols, and the like), para-toluene sulfonic acid, camphor sulfonic acid, and other acid catalysts of this general nature. Friedel-Crafts type catalysts other than $BF_3$ may be used, such as $AlCl_3$, $AlBr_3$, $FeCl_3$, and so forth, as well as inorganic acids generally and their salts such as sodium acid sulfate, sodium acid phosphate, and so forth.

The catalyst may be supported or not on inert supports such as charcoal, silica gel (which alone is a catalyst for the reaction), kieselguhr, and so forth. Concentrations of $BF_3$, $H_2SO_4$ and similarly strong catalysts may be extremely low; less than 0.1%, and amounts down to as low as 0.001% of the strong acid catalyst have been found sufficient to give high molecular weight products although high concentrations of the catalyst even equal to or greater than the weight of the dioxolane are likewise satisfactory.

The reaction is preferably continued approximately to equilibrium in order to obtain the above defined organic compounds. The reaction may then be stopped by destroying the catalyst. This may be done by removing it (in the case of silica gel, kieselguhr, and the like) or by treating the reaction mixture with an inorganic base, such as ammonia, alkali metal, and alkaline earth metal hydroxides, carbonates, alkoxides, and so forth or an organic base, such as pyridine, dimethylamine, and the like. These bases are added in sufficient amounts to neutralize the catalyst when acid catalysts are used, and the unconverted reactants may be removed by distillation under reduced pressures. As soon as the catalyst has been neutralized, the reaction ceases. The neutralized catalyst may be filtered off and the reaction mixture which remains treated for the recovery of the high molecular weight compounds.

In the reaction of the dioxolanes with the acetals and more especially when the higher molecular weight products are being prepared there usually will be found in the reaction mixture along with the high molecular weight compound unreacted dioxolane and the acetal together with by-products and polymers which it is not desired to produce. It is possible to inhibit the formation of the undesired products by carrying out the process in an intermittent or continuous manner whereby the desired product is withdrawn from the reaction zone and the undesirable products, after being separated therefrom, are returned to the reaction zone. By this means it is possible to obtain high yields of the desired product.

In addition to being instrumental in stopping the reaction at the desired point, the neutralization of the catalyst tends to stabilize the products. It follows, therefore, that for high temperature uses no acid should be present in the products. They should preferably be neutral or on the alkaline side.

Examples will now be given illustrating embodiments of the invention but it will be understood that it will not be limited by the details thereof. Parts are by weight unless otherwise indicated.

*Example 1.*—A reaction mixture consisting of 222 parts of 1,3-dioxolane, 684 parts of methylal and 4.5 parts of sulfuric acid was heated under a return condenser supplied with a calcium chloride drying tube for 6.5 hours. Subsequent to neutralization of the catalyst by addition of 4.04 parts of sodium hydroxide dissolved in 10 parts of water to the cooled reaction mixture, the product was fractionally distilled, in the final stages under reduced pressure. 64.5 parts of di-(methoxymethoxy) ethane ($CH_3OCH_2OCH_2CH_2OCH_2OCH_3$)

B. P. 83° C./29 mm., was obtained. Physical and chemical constants of this compound are: hydroxyl No. 0.0, $N_D^{25}$ 1.4014, density at 25° C. 1.0015.

*Example 2.*—Under conditions described in Example 1, 602 parts of di($\beta$-chloroethyl) formal, 258 parts of 1,3-dioxolane and 4 parts of sulfuric acid gave 105 parts of di($\beta$-chloroethyoxymethoxy) ethane ($ClCH_2CH_2OCH_2OCH_2CH_2OCH_2OCH_2CH_2Cl$)

B. P. 128° C./28 mm. Unconverted reactants and undesirable by-products were recycled. This gave an additional 84 parts of di($\beta$-chloroethoxymethoxy) ethane.

The products described are suitable for insecticidal uses, as carriers for contact sprays such as nicotine solutions, the products acting as wetting and penetrating agents. They may be used as absorbents for refrigerants; as flotation agents, the xanthates and sulphides of the lower molecular weight products being employed in this capacity; as extractants for vegetable and animal oils; as ingredients in paint and varnish removers; as solvents in pigment drying; as softening agents in cork processing; and as carbon removers for use in internal combustion engines.

I claim:

1. A process for the preparation of di(methoxymethoxy) ethane which comprises refluxing a reaction mixture of approximately the following composition: 222 parts of 1,3-dioxolane, 684 parts of methylal, and 4.5 parts of sulfuric acid for approximately 6½ hours, neutralizing the catalyst by the addition of approximately 4.04 parts of sodium hydroxide, dissolving in 10 parts of water and recovering the di(methoxymethoxy) ethane from the reaction product by distillation.

2. A process for the preparation of di(methoxymethoxy) ethane which comprises refluxing a mixture of 1,3-dioxolane and methylal, the mixture containing a molar excess of methylal, in the presence of an acidic catalyst until appreciable amounts of di(methoxymethoxy) ethane are obtained, neutralizing the catalyst by the addition of an inorganic base and recovering the di(methoxymethoxy) ethane from the reaction mixture by distillation.

WILLIAM FRANKLIN GRESHAM.

CERTIFICATE OF CORRECTION.

Patent No. 2,382,874. August 14, 1945.

WILLIAM FRANKLIN GRESHAM.

It is hereby certified that error appears in the printed specification of the above numbered patent requiring correction as follows: Page 1, second column, line 47, for "—$CH_2OCH$—$CH_2O$—" read —$CH_2OCH_2$—$CH_2O$—; and that the said Letters Patent should be read with this correction therein that the same may conform to the record of the case in the Patent Office.

Signed and sealed this 4th day of December, A. D. 1945.

Leslie Frazer (Seal) First Assistant Commissioner of Patents.

of water to the cooled reaction mixture, the product was fractionally distilled, in the final stages under reduced pressure. 64.5 parts of di-(methoxymethoxy) ethane ($CH_3OCH_2OCH_2CH_2OCH_2OCH_3$)

B. P. 83° C./29 mm., was obtained. Physical and chemical constants of this compound are: hydroxyl No. 0.0, $N_D^{25}$ 1.4014, density at 25° C. 1.0015.

*Example 2.*—Under conditions described in Example 1, 602 parts of di($\beta$-chloroethyl) formal, 258 parts of 1,3-dioxolane and 4 parts of sulfuric acid gave 105 parts of di($\beta$-chloroethyoxymethoxy) ethane ($ClCH_2CH_2OCH_2OCH_2CH_2OCH_2OCH_2CH_2Cl$)

B. P. 128° C./28 mm. Unconverted reactants and undesirable by-products were recycled. This gave an additional 84 parts of di($\beta$-chloroethoxymethoxy) ethane.

The products described are suitable for insecticidal uses, as carriers for contact sprays such as nicotine solutions, the products acting as wetting and penetrating agents. They may be used as absorbents for refrigerants; as flotation agents, the xanthates and sulphides of the lower molecular weight products being employed in this capacity; as extractants for vegetable and animal oils; as ingredients in paint and varnish removers; as solvents in pigment drying; as softening agents in cork processing; and as carbon removers for use in internal combustion engines.

I claim:

1. A process for the preparation of di(methoxymethoxy) ethane which comprises refluxing a reaction mixture of approximately the following composition: 222 parts of 1,3-dioxolane, 684 parts of methylal, and 4.5 parts of sulfuric acid for approximately 6½ hours, neutralizing the catalyst by the addition of approximately 4.04 parts of sodium hydroxide, dissolving in 10 parts of water and recovering the di(methoxymethoxy) ethane from the reaction product by distillation.

2. A process for the preparation of di(methoxymethoxy) ethane which comprises refluxing a mixture of 1,3-dioxolane and methylal, the mixture containing a molar excess of methylal, in the presence of an acidic catalyst until appreciable amounts of di(methoxymethoxy) ethane are obtained, neutralizing the catalyst by the addition of an inorganic base and recovering the di-(methoxymethoxy) ethane from the reaction mixture by distillation.

WILLIAM FRANKLIN GRESHAM.

CERTIFICATE OF CORRECTION.

Patent No. 2,382,874.　　　　　　　　　　　　　August 14, 1945.

WILLIAM FRANKLIN GRESHAM.

It is hereby certified that error appears in the printed specification of the above numbered patent requiring correction as follows: Page 1, second column, line 47, for "—$CH_2OCH$—$CH_2O$—" read —$CH_2OCH_2$—$CH_2O$—; and that the said Letters Patent should be read with this correction therein that the same may conform to the record of the case in the Patent Office.

Signed and sealed this 4th day of December, A. D. 1945.

Leslie Frazer (Seal) First Assistant Commissioner of Patents.